Aug. 2, 1949.　　　F. E. HUMMEL　　　2,477,805
AUTOMATIC TIMING DEVICE

Filed Sept. 14, 1944　　　2 Sheets-Sheet 1

INVENTOR.
Frederick E. Hummel
By Thed Gerlach
Atty.

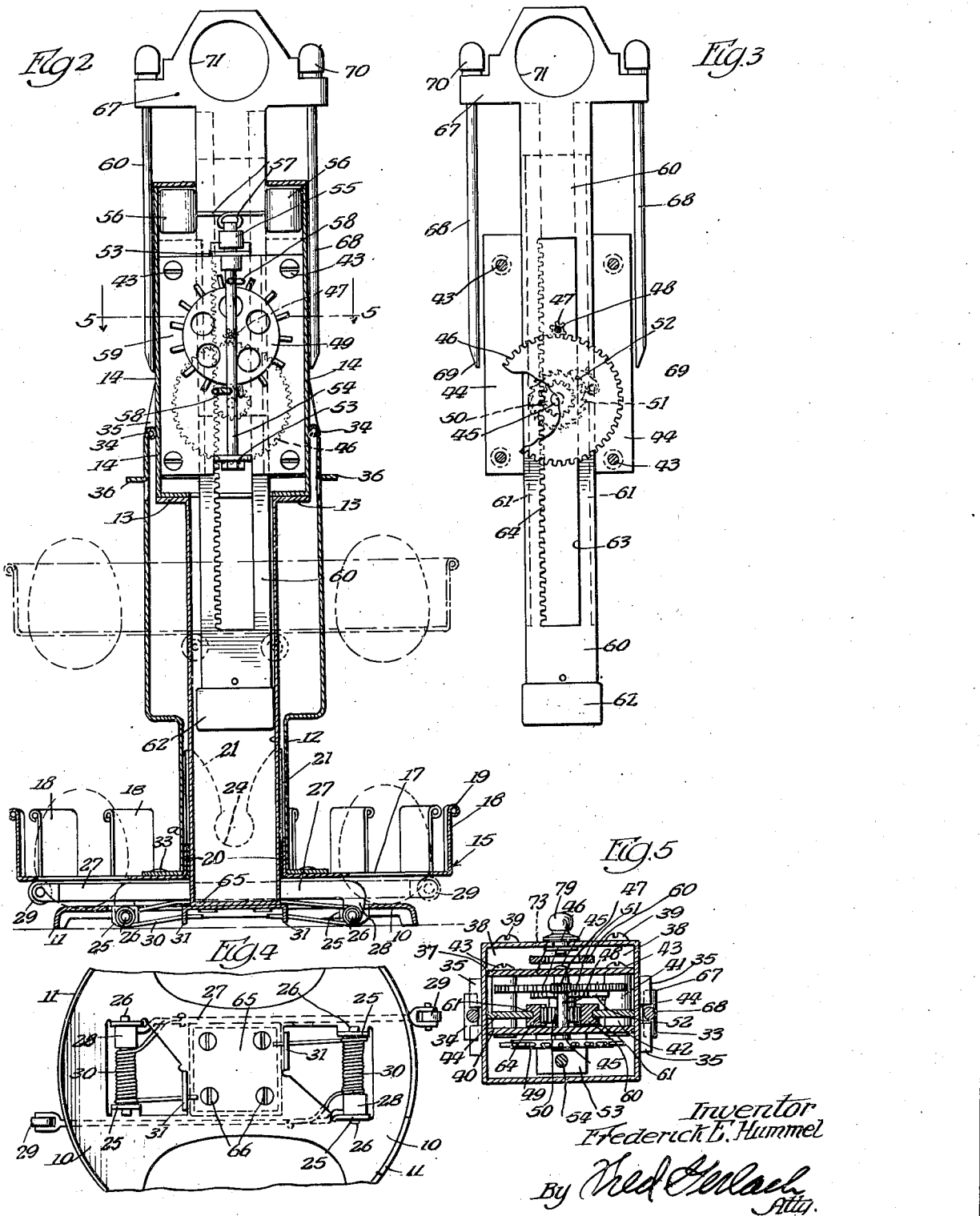

Patented Aug. 2, 1949

2,477,805

UNITED STATES PATENT OFFICE 2,477,805

AUTOMATIC TIMING DEVICE

Frederick E. Hummel, Chicago, Ill.

Application September 14, 1944, Serial No. 554,095

9 Claims. (Cl. 99—336)

This invention relates in general to an automatic timing device, and is more particularly described as an apparatus which may be adjusted for boiling eggs any desired length of time, and automatically removing them from the boiling water when the selected time has elapsed.

The object of the invention is to provide a novel form of holding, releasing and withdrawing means, the egg holder being raised from the boiling water by spring mechanism located at the bottom of and below the egg container, and the entire apparatus being adapted to be inserted in any container for water and removed therefrom at will.

A further object of the invention is to provide improved trigger or releasing mechanism which when actuated at the end of a predetermined or selected time results in the eggs being withdrawn from the water.

A still further object of the invention is to provide improved combined setting and timing apparatus which is arranged in a column, normally located above the level of the liquid in which the eggs are boiled, and is adjustable to vary the difference in timing.

A still further object of the invention is to provide improved simple timing apparatus which is easily set for various timing actions and is so simple in construction that it is not likely to become damaged or get out of order through continuous or hard usage.

Another object of the invention is to provide a timing apparatus of this kind which is generally of new and improved construction, and is characterized by simplicity of design as well as ease and facility of assembly.

Other objects of the invention and various advantages and characteristics of the present timing device or apparatus and the parts associated therewith will be apparent from a consideration of the following detailed description.

The invention consists in the several novel features which are hereinafter described and more particularly defined by the claims at the conclusion hereof.

In the drawings which accompany and form a part of this specification or disclosure and in which like letters and numerals of reference denote corresponding parts throughout the several views:

Figure 2 is a sectional view of the structure shown in Figure 1, showing also the bottom spring structure;

Figure 3 is a detail of the escapement mechanism;

Figure 4 is a plan view of the spring raising structure; and

Figure 5 is a cross section as taken on the line 5—5 of Figure 2.

Figure 1:
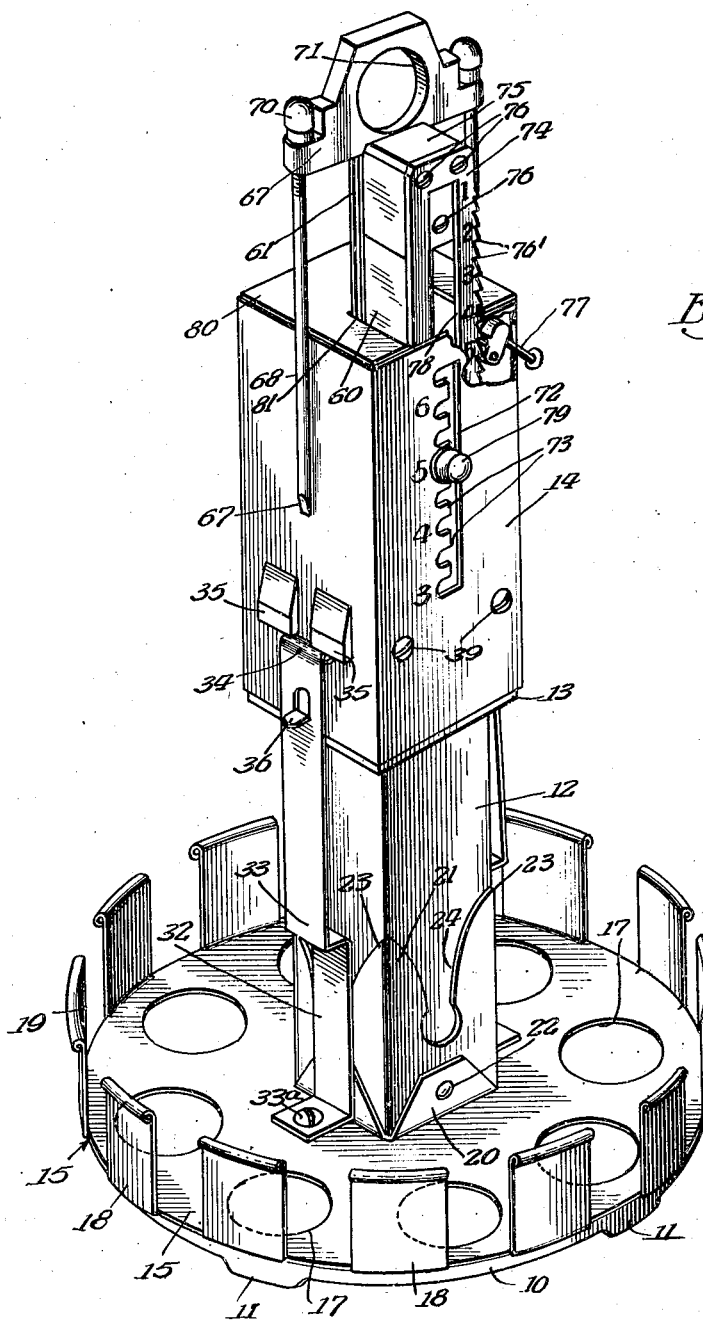
Figure 1 is a perspective of an egg cooking timer in accordance with the present invention, set for a five unit cooking interval.

This invention comprises a timing column having a base adapting it to be supported in a vessel for containing water, with a removable egg holding container at the bottom of the column held in a spring pressed lower position by a latch which is released by the timing mechanism.

Referring now more particularly to the drawings, a base 10, preferably of sheet metal, has a downwardly projecting rim with supporting feet 11 at intervals. Secured to the central portion is a hollow supporting column 12 with outwardly extending flanges 13 at the upper end for supporting a hollow housing 14 somewhat larger in cross sectional area than the lower column portion.

Both the lower support and the housing may be of any desired shape, but they are preferably square or rectangular to seat an egg carrier 15 for movement up and down on the column portion. This carrier is preferably made of sheet metal having a bottom 16 with perforations 17 in which eggs may be seated and with an outer marginal rim of upstanding projections 18 spaced apart less than the diameter of an egg, the projections preferably having rolled upper extremities 19 to obviate sharp edges if the carrier is made of metal. At the central portion of the bottom, a perforation larger than the cross section of the hollow column is provided by cutting angular tongues 20, turning them upwardly and securing a hollow shell 21 thereto by means of rivets 22 or other suitable fastening devices. This shell is of a size to slide freely upon the hollow column 12, the corner portions 23 extend upwardly to provide guiding contact and the portions 24 between the corners are cut away to decorate and lighten the structure.

Mounted in the base 10 upon ears 25 turned downwardly therefrom are pivoting rods 26 disposed at opposite sides of the column. An arm 27 having a perforated extremity 28 is pivoted on each of the rods 26, one arm extending at one side of the column 12 from one of the rods 26, and the other extending oppositely from the other rod at the other side of the column. Each arm has a roller 29 at its outer or free end adapted to engage the under side of the base of the egg carrier 15. A coil spring 30 is also wound about each of the rods 26 having one extremity extending through and held by a downward projection 31 from the base 10, and the other end engaging the arm 27 and tending to force it upwardly.

Spring latches 32 are secured by screws 33ª or other suitable fastening devices to the upper side of the base 10 adjacent the shell 21 at opposite sides of the column 12 and each has an offset upper portion 33 adapted to closely but resiliently engage the upper enlarged housing portion 14. At the upper end of each latch which is preferably made of sheet metal, is a rounded extremity 34 adapted to engage the under sides of two projections 35 extending outwardly from the proximate face of the housing 14, leaving a space between the projections where the rounded end is not engaged.

At a short distance below the top of each latch, the material thereof is bent outwardly to form an ear 36 for assisting in resetting the egg carrier. Mounted within the housing is an escapement mechanism comprising a plate 37 having projections 38 for spacing it inwardly from one wall of the housing and for securing it in place through the wall of the housing by means of inserted screws 39. Another plate 40 is spaced from plate 37 by washers 41 and 42 mounted on screws 43, and two screws 43 on each side mount an intermediate plate 44 thereon held in place between upper and lower sets of washers 41 and 42, the plates 44 being separate and extending inwardly from their respective supporting screws. Mounted upon a shaft 45 between the plates 37 and 40 is a gear wheel 46 which meshes with a pinion 47 mounted on a shaft 48 which carries an escapement wheel 49 on the outer side of the plate 40. Also loosely mounted on the shaft 45 is a pinion 50 connected to a ratchet gear 51 adjacent the gear 46. A ratchet dog 52 secured to the gear 46 is adapted to engage the ratchet gear 51 in one direction of movement to drive the pinion 50 and the gear 46 together, but in the other direction of movement of the pinion 50, the gear 46 is not connected by the ratchet dog 52.

Extending outwardly from the plate 40 at the top and bottom are ears 53 in which a vertical escapement shaft 54 is mounted for free rotative movement. At the upper end of the shaft is a collar 55 supporting two opposite escapement counter weights 56 by means of cross wires 57. Intermediate the ends of the shaft 54 are escapement pins 58 extending therefrom and adapted to engage the escapement projections 59 of the escape wheel 49.

An escapement operator, timer and release mechanism is adjustably mounted for vertical movement and comprises a vertical operating bar 60 with grooves 61 in its opposite edges seating the opposite plates 44 and guiding the operating bar in its vertical movement. At the lower end of the bar is a weight 62 to assist its downward movement and internally of the bar in a recess 63 thereof, is a rack 64 at one side of the recess adapted to engage the pinion 50, moving the pinion in accordance with the movement of the operating bar. The operating bar and the weight 62 thereof is of a size to move freely within the hollow column 12 and the lower end 65 of the column is preferably closed and made liquid tight, but is secured to the base from the under side thereof by fastening screws 66. Thus the lower end of the operating bar is moved freely within the hollow column 12 without being affected by any liquid therein.

At the upper end of the operating bar is a cross piece 67 which extends beyond the sides of the housing 14 having perforated extremities in which are mounted release bars 68 each having a wedging extremity 69 at its lower end adapted to extend between the projections 35 at the opposite outer sides of the housing 40 when the operating bar reaches a lower position. Each of the releasing bars 68 is threaded at its upper end and is adjustably held in place by a fastening nut 70.

In the cross piece is a finger aperture 71 by means of which it may be raised.

In one face of the housing 14 is a vertical aperture 72 having a number of teeth 73 at one side thereof and numerals 3, 4, 5 and 6 designating various time intervals for which the device may be set. Supported near the upper end of the operating bar is a timing plate 74 spaced from the operating bar by a block 75 both secured thereto by fastening screws 76. This plate has ratchet teeth 76 at one outer edge adapted to be engaged by a locking latch 77 to hold it against downward movement in any raised position. The outer face of this plate 74, visible when it is raised with the bar 60, has numerals designating time intervals corresponding with those at the sides of the teeth 73. A recess 78 extends lengthwise of the plate 74 for engaging the inner end of a knob 79 which is seated between the teeth 73 and adjustable with respect thereto for setting the operation and movement of the operating bar to one of the units corresponding to the designations of the teeth 73 or on the plate 74, and the engagement of the inner end of the knob 73 with the lower end of the recess 78 limits the height to which the operating bar may be raised. This height is just sufficient to place the lower ends of the releasing bars near the top of the housing 14.

At the top of the housing is a cover plate 80 which fits around the operating bar, leaving an opening 81 in which the bar and the front timing plate 74 is movable.

In order to operate this apparatus as an egg cooking timer, the egg carrier is pressed downwardly until the upper ends of the latch bars 32 are engaged below the projections 35. Eggs are placed in the carrier and the carrier is inserted in the water or other liquid in which the eggs are to be cooked, the water covering the eggs and extending upwardly to about the bottom of the housing. The operating mechanism is set by raising the operating bar for the units designated by the numerals on the plate 74 or by setting the timing knob 79 in one of the positions designated by the teeth 73. If the knob is set for some position, the operating bar can only be lifted until the bottom of the plate aperture 78 engages the inner end of the operating knob.

The operating bar is then released and the weight of the operating bar is sufficient to drive the escapement mechanism through the engagement of rack 64, pinion 50, its connected ratchet gear 51, and through ratchet dog 52 to gear 46, thence through pinion 48, escapement wheel 49, escapement bar 58, escapement shaft 54 which is given additional inertia by the escapement counter weights 56, thus allowing the escapement bar 60 gradually to descend within the housing and hollow column 12, carrying with it the releasing bars 68 until their wedging surfaces 67 are moved between the projections 35 at opposite sides of the housing to engage below the upper curved extremities 34 of the spring latches 32, thus allowing the spring arms 27 to force the egg carrier and the eggs therein upwardly from the lower to the upper position as indicated in Figure 2, raising the eggs out of the cooking liquid.

This apparatus may also be similarly used for timing other operations and mechanisms. Although the units most commonly employed in cooking eggs are minutes, the intervals of time may be differently selected if desired.

This invention is not to be understood as restricted to the details set forth since these may be modified within the scope of the appended claims, without departing from the spirit and scope of the invention.

Having thus described the invention, what I claim as new and desire to secure by Letters Patent is:

1. In a timer of the class described, a base with an upwardly extending support, an egg carrier movable vertically on the support, resilient means carried by the base for pressing the carrier upwardly, latches extending upwardly from the carrier, projections at the outside of the support for engaging the upper ends of the latches to hold the carrier in its lower position, and timing mechanism within the support including an operating bar extending above the top of the support, a cross head at the top of the bar, and releasing bars extending downwardly from the cross head and having wedging extremities for engaging the upper ends of the latches and disengaging them from the projections.

2. A timing mechanism of the class described, comprising a base with an upwardly extending support, a carrier movable vertically on the support, spring means between the carrier and base for moving the carrier upwardly, latch means extending upwardly from the carrier, projections from the support for engaging the upper ends of the latch means to hold the carrier in lowered position, timing mechanism mounted in the support comprising an operating bar extending outwardly through the top of the support, a cross head at the top of the bar having a finger hold portion for raising the bar, releasing means extending downwardly from the cross head to disengage the upper ends of the latches from the projections, an apertured plate carried by the bar and located adjacent the inner face of one side of the support, and means adjustable in height along the support and projecting inwardly for engaging the lower end of the aperture of the plate thus determining the extent to which the operating bar is raised.

3. A timing mechanism of the class described, comprising a base with an upwardly extending support, a carrier movable vertically on the support, spring means between the carrier and base for moving the carrier upwardly, latch means extending upwardly from the carrier, projections from the support for engaging the upper ends of the latch means to hold the carrier in lowered position, timing mechanism mounted in the support comprising an operating bar extending outwardly through the top of the support, a cross head at the top of the bar having a finger hold portion for raising the bar, releasing means extending downwardly from the cross head to disengage the upper ends of the latches from the projections, a plate with a longitudinal aperture carried at the upper end of the operating bar and having timing unit designations at the outside of the plate, a timing projection knob, a notched slot in the support in which the timing projection knob is vertically adjustable, the slots having timing designations and the projection of the knob engaging in the aperture of the plate to limit the upward movement of the operating bar.

4. A timing mechanism of the class described, comprising a base with an upwardly extending support, a carrier movable vertically on the support, spring means between the carrier and base for moving the carrier upwardly, latch means extending upwardly from the carrier, projections from the support for engaging the upper ends of the latch means to hold the carrier in lowered position, timing mechanism mounted in the support comprising an operating bar extending outwardly through the top of the support, a cross head at the top of the bar having a finger hold portion for raising the bar, releasing means extending downwardly from the cross head to disengage the upper ends of the latches from the projections, a plate secured to the upper end of the operating bar inside of the support, the plate having a toothed edge and unit timing designations, an adjustable timing projection and a slot in which it is mounted for vertical movement in the support, the projection engaging the plate to limit its upward movement, and a movable locking latch pivoted in the support and engageable with the toothed edge to hold the operating bar in any raised position.

5. A timer of the class described, comprising a base with an upwardly extending hollow support, an egg carrier movable vertically on the support, a latch connected to, and extending upwardly from, the carrier, the support having an exterior projection with which the upper end of the latch is engaged when the carrier is in lowered position, a timer disposed for the most part within the support and having releasing means disposed outwardly of the support and movable downwardly to disengage the latch from the projection, and spring means mounted on the base and resiliently urging the carrier upwardly.

6. An egg cooking timer, comprising a base with an upwardly extending support having an enlarged housing at the top, an egg carrier movable vertically on the support, latches extending upwardly above the carrier and having offset central portions to engage below the housing, said housing having projections adapted to be engaged by the upper ends of the latches, a timer within the housing having releasing means movable downwardly to disengage the upper ends of the latches from the projections, and spring means mounted on the base and resiliently urging the carrier upwardly, the upward movement of the carrier being limited by the engagement of the offset portions of the latches with the bottom of the housing.

7. In a timing mechanism of the class described, a base having a hollow upright support, a carrier movable downwardly on the support, spring means mounted on the base and arranged to urge the carrier upwardly, a pair of latches connected to, and extending upwardly from, the carrier, exterior projections on the support for engaging the upper ends of the latches and holding the carrier in depressed position, and timing mechanism mounted for the most part within the support and having depending, downwardly movable releasing bars disposed outside of the support and adapted in response to downward movement to engage the upper ends of the latches and wedge them away from the projections so as to allow the spring means to raise the carrier on the support.

8. In an egg cooking timer, a supporting base with an upwardly extending hollow support liquid-tight at the bottom, an egg carrier mounted for vertical movement on the outside of the support, spring means mounted on the base for pressing the carrier upwardly on the support, latches extending upwardly from the carrier at the sides of the support, projections on the outside of the support for engaging the upper ends of the latches to hold the carrier in the lower portion, and timing mechanism mounted for the most part in the support and including an operating bar movable downwards relatively to the support, and releasing means connected to the upper end of the bar, extending downwardly therefrom outwards of the sides of the support and adapted in response to downward movement of the bar to engage the upper ends of the latches and release them from said projections.

9. A timing mechanism of the class described, comprising a base with an upwardly extending hollow support, a carrier movable vertically on the support, spring means between the carrier and base for moving the carrier upwardly, latch means extending upwardly from the carrier and disposed exteriorly of the support, projections on the support for engaging the upper ends of the latch means to hold the carrier in lowered position, and timing mechanism mounted for the most part in the support and comprising a vertical operating bar extending outwardly through the top of the support, a cross head at the top of the bar having a finger hold portion for raising the bar, releasing means extending downwardly from the cross head, disposed outwards of the support, and adapted to disengage the upper ends of the latches from the projections, and means carried by the operating bar and on the support for predetermining the time of the downward movement of the bar.

FREDERICK E. HUMMEL.

REFERENCES CITED

The following references are of record in the file of this patent:

UNITED STATES PATENTS

| Number | Name | Date |
|---|---|---|
| 915,711 | Blanchard | Mar. 16, 1909 |
| 1,096,250 | Lamb | May 12, 1914 |
| 1,355,817 | Curtis | Oct. 19, 1920 |
| 1,410,754 | Hayward | Mar. 28, 1922 |
| 1,504,546 | Curtis | Aug. 12, 1924 |
| 1,560,578 | Hummel | Nov. 10, 1925 |
| 2,361,446 | Anderson | Oct. 31, 1944 |